Oct. 7, 1969    J. P. BENNETT ET AL    3,471,778
METHOD OF TESTING AN ORDERED, MULTI-ELEMENT ELECTRICAL CIRCUIT
ARRAY INCLUDING CONNECTING CERTAIN ELEMENTS IN COMMON
Filed Jan. 13, 1967

INVENTORS
JACK P. BENNETT
DAVID GORDON
MYRON M. KUTCHER

BY *David E. Lovejoy*

AGENT

United States Patent Office 3,471,778
Patented Oct. 7, 1969

3,471,778
METHOD OF TESTING AN ORDERED, MULTI-ELE-
MENT ELECTRICAL CIRCUIT ARRAY INCLUD-
ING CONNECTING CERTAIN ELEMENTS IN
COMMON
Jack Plymette Bennett, West Hurley, David Gordon,
Hurley, and Myron Martin Kutcher, Woodstock, N.Y.,
assignors to International Business Machines Corpora-
tion, Armonk, N.Y., a corporation of New York
Filed Jan. 13, 1967, Ser. No. 609,026
Int. Cl. G01r 31/02, 15/12
U.S. Cl. 324—51                                       5 Claims

ABSTRACT OF THE DISCLOSURE

Disclosed is a method for testing shorts between N networks of elements in a circuit array wherein the elements are arbitarily ordered. By interconnecting in common, for each network, elements of a "lower order" than the lowest order element in the network and by detecting the electrical condition (open) between each lowest order element and the respective lower order elements, a verification of an electrical open condition between each network is achieved.

CROSS REFERENCES TO RELATED APPLICATIONS (1) "Constant Current Circuit," S.N. 517,333, filed: Dec. 29, 1965.

(2) "Circuit Tester and Addressing Apparatus," Ser. No. 609,085, Inventors: Jack P. Bennett, Charles Harring, and William Teo.

BACKGROUND OF THE INVENTION

The general field of this invention relates to methods of testing for shorts, faults, or other similar electrical conditions in multi-pin circuit arrays, multi-conductor electric cables, and other multi-element devices variously defined as having a plurality of contact points, electrodes, terminals, etc. Some of the elements in these devices to be tested are electrically interconnected to form networks where each network has a particular electrical relationship with the other networks in the array. The usual relationship is that of an open circuit (very high impedance) although other relationships may be detected by the method of this invention.

Prior art methods of testing the electrical relationship between networks in an arrany have presented a number of problems. One prior art method of testing employs seriatim steps in which each network is individually tested against every other network in the array. If the number of networks to be tested by the seriatim methods is N then the number of tests, T, necessary to establish the existence of the desired condition between each network in the array is given by the following equations:

$$T = 1 + 2 + \cdots + (N-2) + (N-1)$$
$$= \sum_{i=1}^{(N-1)} i$$

As is apparent from the above equations, the seriatim methods of testing require a very large number of tests to be made, particularly as N grows large. This large number of tests is redundant and wastes time.

In order to overcome the redundancy problem of the seriatim methods, other prior art methods employ a technique of grouping elements together in order to reduce the number of tests. The prior art grouping consists of interconnecting in common all the networks except the network under test. The network under test is then tested against all those networks interconnected in common. Thereafter, a new network is selected, all other networks are interconected in common, and the new network is tested against the networks interconnected in common. These steps are continued until all networks have been tested against an interconnection in common of all the other networks. This latter method requires fewer tests than the seriatim method as given by the following expression:

$$T = N$$

Although the interconnecting in common method reduces the number of tests and therefore the redundancy, it has only been utilized in the prior art with two-element networks, such as multi-conductor electric cables, where the location of each element in the network (one terminal pin at each end of the cable wire) is well known. When this prior art interconnecting in common method is extended to networks including more than two elements, it becomes very cumbersome and time consuming, particularly where the number of elements per network is large. The problem which arises in extending that method to many-element-per-network arrays is the difficulty in defining which elements are to be interconnected in common. The inclusion of any element from a network under test with the other networks interconnected in common would yield, of course, an incorrect test result. Therefore, it would be necessary to under take the burdensome and time consuming task of keeping track of the location of every element in every network to assure that it was not improperly interconnected in common. This indeed is not only inefficient but difficult to implement with automatic selection circuitry.

Both the seriatim and interconnection in common methods described above employ sequential selection techniques in which networks or groups of networks are connected in sequence to a test unit in order to carry out the steps of the method. Alternative prior art methods utilize simultaneous parallel detection steps in which a separate test unit for each network is employed. Although these parallel detection methods allow the simultaneous testing of all the networks in the array, they may be disadvantageous for a number of reasons. For example, some parallel methods are expensive and difficult to implement or perform because of the high number of test units required. Other parallel methods employ magnetic cores to detect the connections between elements in arrays but these methods have been limited to a relatively slow serial read out of the cores while not allowing high current or voltage testing of the circuit arrays because of the cores.

In light of the foregoing background problems and limitations inherent in the prior art, it is an object of the present invention to overcome those and other problems and limitations by providing an improved method of testing as summarized in the following manner.

SUMMARY OF THE INVENTION

The present method of testing is of the sequential type where the networks are connected in sequence to a test unit as distinguished from the parallel testing type where all the networks are connected in parallel to plural respective test units. Further, this invention employs the grouping principle where a plurality of elements are interconnected in common. In the present invention, the elements interconnected in common are denominated as "lower order" elements (to be hereinafter defined) as distinguished from the prior art where entire networks are interconnected in common.

The terms lowest order and lower order have their genesis in the arbitary ordering of the circuit array to be tested. For example, if there are twelve elements in the array, they are arbitrarily ordered by assigning them the numbers 1, 2, 3 . . . , 12. It should be clearly noted that the ordering is entirely arbitrary and may be achieved in any manner desired. Further, if elements 4, 5, and 6 are electrically interconnected into a first network and elements 3, 9, and 10 are electrically interconnected into a second network, then the lower order elements for the first network are elements 1, 2, and 3 because these are the elements in the circuit array, with the specified order, which are of lower order than the lowest order element, element 4, of the first network; and the lower order elements for the second network are elements 1 and 2 because these are the elements in the circuit array which are of lower order than the lowest order element of the second network. In the above circuit array example, the first network would have as its lowest order element, element 4 and the second network would have as its lowest order element, element 3. Of course, the elements could have been ordered in some other sequence. For example, the twelve elements 1, 2 . . . , 12 could be renumbered 1, 12, 11, 10, 9, 8, 2, 3, 4, 5, 6, and 7, respectively. With such an ordering, elements 10, 9, and 8 would form the first network and the elements 4, 5, and 11 the second. The lower order elements for the second network would be 3, 2, and 1; for the first 7, 6, 5 . . . , 1. These basic definitions arising from the arbitary ordering of the elements in a circuit array are necessary for understanding the operative steps of the invention.

The method of the present invention includes, for each network, the step of electrically interconnecting in common all the lower order elements for the particular network under test and, with a test unit, the step of detecting the electrical condition between the lowest order element of the network under test and all the interconnected lower order elements. By way of example, assume that the condition being tested for is a short between any of the networks. Then if, after completion of all the detection steps for all the networks, an open condition (very high impedance) has been found for each detection step, each network is isolated from (not shorted to) every other network tested in the circuit array. The test for isolation of the networks is, of course, dependent upon the existence of continuity between each element in each of the respective networks. If continuity does not exist in any network, then the short test maybe in error.

The foregoing method, like prior art sequential testing methods, is more advantageous than parallel testing methods because it economically requires only one test unit. Additionally, like the prior art interconnection in common methods, the present invention, also employing the grouping principle, is superior to the seriatim method of testing in that it reduces redundancy and requires a minimum number of detection steps in order to achieve a 100% test of the circuit array. In the present invention, the number of tests, T, necessary to establish the existence of the desired condition between each network in the array is equal to N, the number of networks in the array to be tested.

The present method, while retaining the aforementioned features of all the prior art methods, is superior to the prior art interconnection in common methods in that it can be used both on small circuit arrays while also being economically extendable to very large circuit arrays. Further, the present method is simpler and easier to implement than those methods in that only the location of the lowest order element in every network must be known as compared with the prior are requirement of knowing the location of every element in every network. This savings is particularly significant when networks with a large number of elements are contemplated. Still further, the present invention is simpler and saves time in that the number of elements which must be interconnected in common is reduced since only the lower order elements must be interconnected as distinguished from the prior art requirement of interconnecting all the networks excepting the network under test. It should also be noted that the present invention is particularly adaptable to a mechanized, automatic operation. Since the shorts test is valid only if continuity exists in the networks, the present testing method when mechanized leads readily to a mechanized testing for undesired opens in the networks.

The foregoing and other objects, features and advantages of the invention will be apparent from the following more particular description of preferred embodiments of the invention, as illustrated in the accompanying drawings.

DESCRIPTION OF THE PREFERRED
EMBODIMENTS

The method of the present invention can be carried out by hand using hand-operated testing equipment and also can be carried out automatically by using fully automatic element selection and detection apparati. The hand method will be disclosed hereinafter in detail while the fully automatic embodiment will be incorporated by reference to the aforementioned related co-pending applications.

Figure 1:
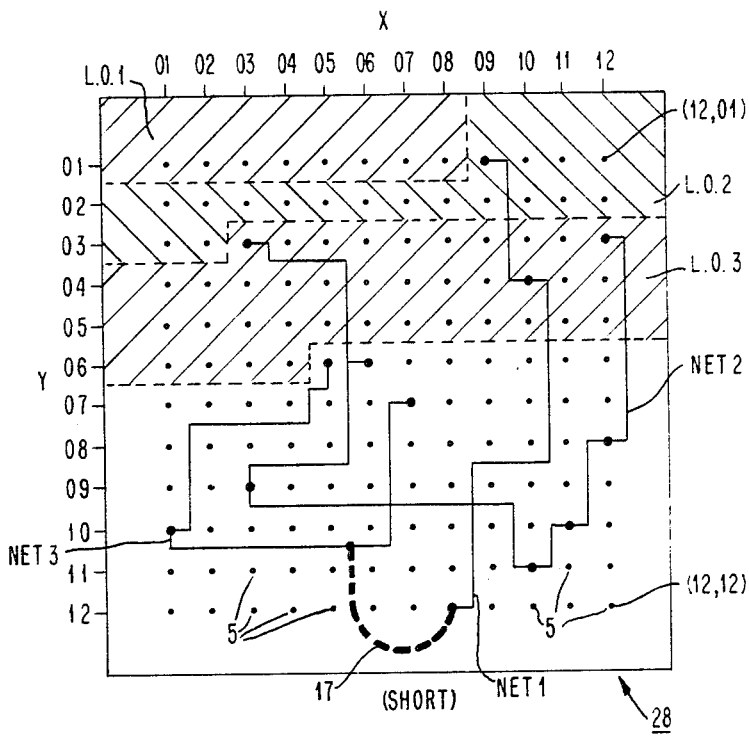
FIG. 1 depicts a circuit array having a plurality of networks which are to be tested by the method of the present invention.

FIG. 1 depicts a typical circuit array 28 to be tested. The circuit array includes a plurality of elements 5 (contacts, pins, electrodes, etc.) which are arranged in a rectangular matrix having an X axis and a Y axis. Each element 5 in this 12 by 12 matrix is given an address including an X component and a Y component. For example, the element 5 in the lower righthand corner is given the address (12, 12), the element in the upper righthand corner is given the address (12, 01). Some of the elements in the array are interconnected into networks. For example, Net 1 includes the elements having addresses (09, 01), (10, 04), and (08, 12). Similarly, Net 2 includes the elements (12, 03), (12, 08), (11,10), (10, 11), (03, 09), (06, 06), and (03, 03). Net 3 includes the elements (05, 06), (01, 10), and (07, 07).

While the total number of elements in the circuit array has been shown to be 144 the number of elements can be much larger; and similarly, the number of networks and elements per network can also be much larger. Although the mechanical details of the circuit array are not disclosed they are readily apparent to those skilled in the art. Such arrays are commonly cable connectors, terminals for electronic computers, contact points, electrodes, pins, and other elements commonly found in electrical circuits and apparatus. Although the elements have been shown in a rectangular array this arrangement is merely for convenience as any arrangement of elements whether in one, two, or three dimensions may be utilized. All that is required is that a plurality of discrete elements exist such that they are capable of being assigned some arbitrary order (e.g., the X and Y coordinate ordering indicated above).

The lower order (L.O.) elements using the above ordering system will be defined for any particular element, $P_0$, which has coordinates given by $(X_0, Y_0)$. The lower order elements for $P_0$ are defined by the following conditions:

For $Y<Y_0$, all the elements having coordinates represented by all X and all $Y<Y_0$;

For $Y=Y_0$, all the elements having coordinates represented by all $X<X_0$ and $Y=Y_0$.

By way of example for Net 1, the lowest order element has an address (09, 01) and the lower order elements have addresses (01, 01), (02, 01) . . . ; (08, 01) as shown in the shaded portion designated L.O. 1. In a similar manner, the lowest order element for Net 2 has an address (03, 03) and the lower order elements are those indicated in the shaded portion L.O. 2 plus the shaded portion L.O. 1. For Net 3 the lowest order element address is (05, 06) and the lower order elements are as indicated in the shaded portions of L.O. 3, L.O. 2, and L.O. 1.

Figure 2:
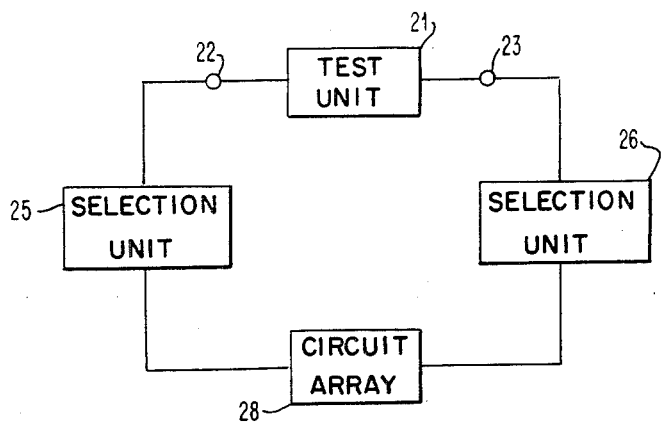
FIG. 2 depicts in block diagram form the hardware configuration for carrying out the method of the present invention.

FIG. 2 depicts in block diagram form the hardware necessary to carry out the method of the present invention. Test unit 21 may include, for hand operation, a conventional ohmmeter, a high voltage source and current indicator, or other conventional electrical testing devices for detecting the electrical condition between two electrical elements. For automatic operation, a device such as that shown in the co-pending application entitled, "Constant Current Circuit" having Ser. No. 517,333, filed Dec. 29, 1965 and asigned to the same asignee as the present invention is preferred.

The testing (detecting) functions carried out by test unit 21 may vary considerably. For example, the networks may be interconnected with capacitors (not shown) to yield a low impedance AC interconnection while maintaining DC isolation. Desiring those characteristics, the test unit 21 can be used to measure the DC impedance for each network tested and assure that a high DC impedance (an open circuit or isolation) exists. Those skilled in the art will realize the wide variety of tests which can be performed and also the conventional testing units which will be employed in carrying out those tests. All of the test units must be two-terminal devices having a connection to the first input 22 and another connection to the second input 23 as shown in FIG. 1. In a first preferred embodiment, a conventional vacuum tube volt-ohmmeter will be preferred for hand operation.

For electrically connecting the lowest order element of the network under test to the first input 22 of the test unit 21, a selection unit 25 is employed. For hand operation, selection unit 25 may consist of one or more clip leads to be attached by hand between the lowest order element and input 22.

Similarly, for electrically interconnecting in common a test group of elements consisting of all the lower order elements associated with the network having its lowest order element connected to input 22 and for further electrically connecting that group to a second input 23 of the test unit 21, the selection unit 26 is provided. For hand operation, the selection unit 26, like selection 25, preferably consists of one or more clip leads and bus connectors well known to those skilled in the art. The leads and clips are connected from the input 23 of test unit 21 to all the lower order elements associated with the particular network under test.

Alternatively, for automatically electrically connecting and electrically interconnecting in common, selection units 25 and 26 would be the automatic selection apparatus and associated control circuitry disclosed in the co-pending application entitled, "Circuit Tester and Addressing Apparatus" having Ser. No. 609,085, filed Jan. 13, 1967. The apparatus and method of operation in that co-pending application is hereby incorporated by reference for the purpose of completing the disclosure of the present invention as it relates to fully automatic operation.

A detailed explanation of the method of testing of the present invention can be explained with reference to a specific example. Assuming that a short 17 exists between Net 1 and Net 3, that short 17 would be detected in the following manner. With test unit 21 an ohmmeter, the step of electrically connecting the lowest order element (09, 01) of Net 1 to the first input 22 would be done by hand using the leads and clips of selection unit 25. Next, the step of electrically interconnecting in common the lower order test group of elements shown in the shaded portion L.O. 1 and electrically connecting those elements to the second input 23 is done by hand using the leads and clips of selection unit 26. Next, the ohmmeter of test unit 21 is used to detect the electrical condition between the lower order elements in shaded portion L.O. 1 and the lowest order element (09, 01). Since there are no connections to the lower order elements in the shaded portion L.O. 1, the condition detected is that of an open (very high impedance) indicating that the next network should be tested. The step of disconnecting the lowest order element and the group of elements consisting of the lower order elements is also carried out by hand in preparation for testing the next network.

The steps carried out for Net 1 are repeated by connecting the lowest order element (03, 03), of Net 2 to the input 22. Thereafter, the lower order elements in the shaded portion L.O. 2 (including, incidentally, those elements in the shaded portion L.O. 1) are connected by hand to the input 23 of test unit 21. Next, the step of detecting the electrical condition between the lowest order element of Net 2 and the lower order elements yields an open since none of the lower order elements have any connection by any path to Net 2.

Finally, the lowest order element for Net 3 is electrically connected to the input 22 and the lower order elements shown in the shaded portion L.O. 3 (and including incidentally, those elements in both the shaded portions L.O. 2 and L.O. 1) are connected to input 23. The step of detecting the electrical condition between the lowest order element and the group of lower order elements yields a short circuit because of the short 17 interconnecting Net 3 and Net 1. The electrical path runs from elements (09, 01) and (10, 04) (which are electrically interconnected in common and connected to the input 23) through Net 1 to the element (08, 12), to the Net 3 via the short 17, and finally to the lowest order element (05, 06) of Net 3 which is, of course, connected to the input 22.

After removal of the short 17, the above steps are repeated. With short 17 removed, the results of each detection step indicates an open circuit assuring the isolation of each network from every other network in the circuit array.

While the implementation of the method of this invention has been disclosed in detail utilizing a hand operation, the steps in the automatic embodiment are identical with those of the hand operation. If it is desired to automatically carry out the steps of the method, another preferred embodiment is disclosed in the aforementioned invention entitled, "Circuit Tester and Addressing Apparatus" which should be referred to for an understanding of the details of automatic operation.

Although the invention has been described with reference to "Lower Order" elements, an analogous test definition is one in which the elements of a higher order than the highest order element are interconnected in common. Since the ordering of elements in the circuit array is arbitrary, however, a higher order test would be converted to the lower order test merely by re-ordering the elements in the array. Accordingly, for the purposes of this invention, the term "lower order" is meant to include "higher order" or any other analogous operation. As previously pointed out, the ordering is entirely arbitrary so that any "higher order" test is identical to a "lower order" test—the difference merely being an arbitrary ordering scheme.

Although the term "network" has typically referred to two or more elements interconnected, the term for the purposes of this invention naturally includes single element networks which are required to be tested for some electrical condition with reference to the other networks.

What is claimed is:

1. A method of testing an ordered, multi-element circuit array which includes a plurality of electrical networks where each network includes a plurality of elements, comprising, for each network to be tested, the steps of:
    defining a point in said array as origin;
    locating in each network to be tested a first element which would be first intercepted by a line beginning at said origin and following a path of increasing order according to the ordering of said array;

interconnecting in common only all elements of said array between said origin and said first element along said path of increasing order;

detecting the electrical condition between said first elements and said interconnected elements for each network to be tested;

repeating the steps of locating, interconnecting, and detecting for each network to be tested, thereby achieving a complete test of the electrical condition between all the elements and all the networks in the array.

2. A method of testing an ordered multi-element circuit array which includes a plurality of electrical networks where each network includes a plurality of elements comprising, for each network to be tested, the steps of:

electrically connecting the first occurring element of the network under test in said ordered circuit array to a first input of a test unit;

electrically interconnecting in common a test group of elements, and further electrically connecting said test group to a second input of said test unit, said test group consisting of only all elements of said circuit array lying on a path between the origin of said array and said first element of the network under test;

detecting with the test unit the electrical condition between said first element and said group of elements;

disconnecting said first element and said group of elements to prepare for the next network to be tested;

repeating the steps for every network to be tested, thereby achieving a complete test of electrical condition between all of the tested networks in the array.

3. The method of claim 2 wherein said electrically connecting step and further electrically connecting step are automatically performed to achieve a complete test of the electrical condition between each of the networks in the circuit array.

4. The method of claim 2 wherein,
said detecting step is impedance measuring whereby the existence of the isolation of all networks from each other.

5. The method of claim 2 wherein,
said detecting step is impedance measuring whereby the existence and quality of the impedance isolation of all networks from each other is determined.

References Cited
UNITED STATES PATENTS

| | | | |
|---|---|---|---|
| 2,699,528 | 1/1955 | Periale | 324—24 |
| 1,977,703 | 10/1934 | Swartwout | 324—73 |
| 3,170,115 | 2/1965 | Tabor | 324—51 |

GERARD R. STRECKER, Primary Examiner

U.S. Cl. X.R.

324—73

PO-1050
(5/69)

UNITED STATES PATENT OFFICE
CERTIFICATE OF CORRECTION

Patent No. 3,471,778        Dated October 7, 1969

Inventor(s) Jack P Bennett, David Gordon, Myron M. Kutcher

It is certified that error appears in the above-identified patent and that said Letters Patent are hereby corrected as shown below:

Column 8, line 6, should read as follows:

necting step, --said electrically interconnecting step-- and further electrically connecting step are

SIGNED AND
SEALED
JAN 19 1971

Jan 19, 1971

(SEAL)
Attest:

Edward M. Fletcher, Jr.
Attesting Officer

WILLIAM E. SCHUYLER, JR.
Commissioner of Patents